United States Patent
Breeden et al.

(10) Patent No.: US 9,803,129 B2
(45) Date of Patent: Oct. 31, 2017

(54) WATER-BASED DRILLING FLUIDS CONTAINING CROSSLINKED POLYACRYLIC ACID

(71) Applicant: Newpark Drilling Fluids LLC, The Woodlands, TX (US)

(72) Inventors: David L. Breeden, Missouri City, TX (US); Scott Gordon, Katy, TX (US)

(73) Assignee: Newpark Drilling Fluids LLC, The Woodlands, TX (US)

( * ) Notice: Subject to any disclaimer, the term of this patent is extended or adjusted under 35 U.S.C. 154(b) by 315 days.

(21) Appl. No.: 14/146,781

(22) Filed: Jan. 3, 2014

(65) Prior Publication Data
US 2014/0135238 A1 May 15, 2014

Related U.S. Application Data

(62) Division of application No. 12/974,764, filed on Dec. 21, 2010, now Pat. No. 8,623,790.

(51) Int. Cl.
*C09K 8/12* (2006.01)
*C09K 8/24* (2006.01)

(52) U.S. Cl.
CPC . *C09K 8/12* (2013.01); *C09K 8/24* (2013.01)

(58) Field of Classification Search
None
See application file for complete search history.

(56) References Cited

U.S. PATENT DOCUMENTS

| 4,944,634 | A | * | 7/1990 | Alexander | C09K 8/145 106/197.01 |
| H1000 | H | * | 12/1991 | Patel | C09K 8/28 507/103 |
| 5,641,890 | A | * | 6/1997 | Wesley | C08J 3/091 44/266 |
| 5,710,107 | A | * | 1/1998 | Walker | C09K 8/206 507/110 |
| 5,773,706 | A | * | 6/1998 | Wesley | C10L 7/04 44/266 |
| 5,789,349 | A | | 8/1998 | Patel | |
| 2008/0167203 | A1 | * | 7/2008 | Bradbury | C09K 8/03 507/116 |

FOREIGN PATENT DOCUMENTS

CN 1869147 A 11/2006

OTHER PUBLICATIONS

"Fanning Friction Factor", Wikipedia, https://en.wikipedia.org/wiki/Fanning_friction_factor (2015).
"Reynolds Number", Wikipedia, https//en.wikipedia.org/wiki/Reynolds_number (2015).

* cited by examiner

*Primary Examiner* — John J Figueroa

(57) ABSTRACT

A water-based drilling fluid containing high molecular weight crosslinked polyacrylic acid as viscosifying agent exhibits stability at well temperatures in excess of 150° C. The drilling fluid may further contain a lubricant, weighting agent and/or a wetting agent as well as laponite clay. The aqueous based drilling fluid exhibits a coefficient of friction which is substantially close to the coefficient of friction of oil based drilling muds.

29 Claims, 1 Drawing Sheet

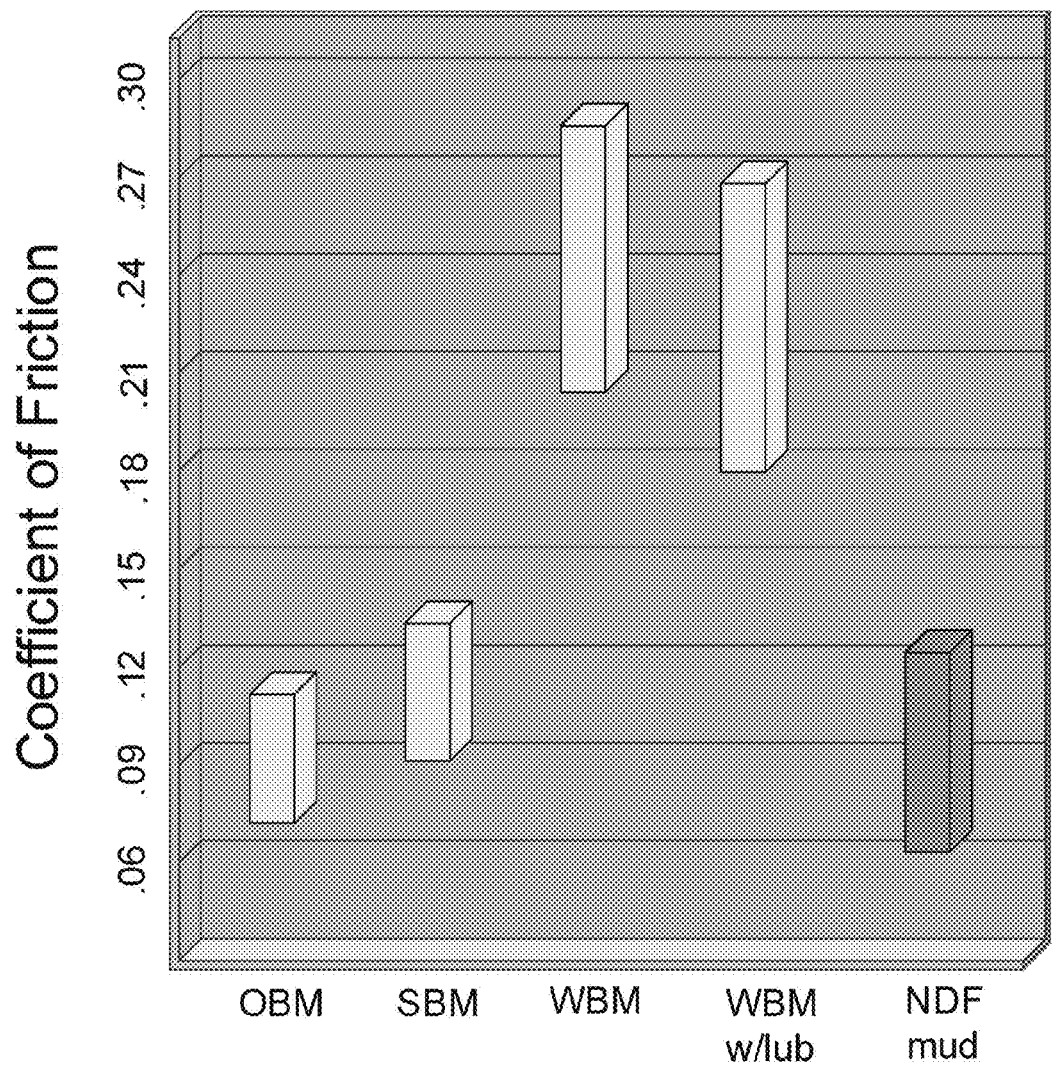

WATER-BASED DRILLING FLUIDS CONTAINING CROSSLINKED POLYACRYLIC ACID

This is a divisional application of U.S. patent application Ser. No. 12/974,764, filed Dec. 21, 2010.

FIELD OF THE INVENTION

The invention relates to water-based drilling fluids containing a crosslinked polyacrylic acid.

BACKGROUND OF THE INVENTION

Drilling of most oil and gas wells includes the use of a drilling fluid, commonly known as drilling mud. The fluid is injected under pressure through the drill string during drilling and returns to the surface through the drill string-borehole annulus. Once returned to the surface, the drilling fluid contains cuttings from the drill bit. Although most large cuttings are removed at the surface prior to recirculating the fluid, smaller sized particles remain suspended within the drilling fluid.

In addition to the removal of drilled cuttings from the wellbore, drilling fluids perform other functions. Such functions include cooling of the drill bit, lubrication of the drill bit, optimizing the transmission of hydraulic energy to the drill bit, increasing the stability of the borehole and providing hydrostatic pressure to prevent the collapse or high pressure geologic zones when such zones are penetrated by the drill bit.

Four properties must be balanced when selecting a proper drilling fluid: viscosity, density, gel strength, and filtration.

Generally, viscosity is maintained as low as possible to provide the required hole stability and fluid loss control. While thin fluids generally clean the drill bit best, thick muds are often essential in order to remove coarse gravel from the hole.

An increase in density, defined as the weight per unit volume of drilling fluid, is a measure of the quantity of drilled material being carried in suspension and re-circulated. Excess suspended cuttings are not desired since they are generally abrasive and increase wear on the pump, drill string and drill bit. Re-grinding of cuttings also tends to decrease the rate of the drilling progress. Further, a higher concentration of solids in the fluid generally results in the formation of a thicker filter cake on the walls of the borehole.

Gel strength is the measure of the capability of a drilling fluid to hold particles in suspension after flow ceases. Keeping cuttings in suspension prevents sandlocking of tools in the borehole while joints of drill pipes are added to the drill string and minimizes sediment collecting in the bottom of the hole. A drawback to high gel strength is the failure of cuttings to readily settle out of the drilling mud. This normally means that such cuttings will be re-circulated, thus resulting in grinding of particles by the drill bit, increased mud density, increased mud pump wear, and lower penetration rate.

Filtration refers to the ability of the drilling fluid to limit fluid loss to the formation by deposition of mud solids in the form of a filter cake on the walls of the hole. While the ideal filter cake is thin with minimum fluid loss by intrusion into the formation, the thickness of the filter cake for a mud is generally a function of the permeability of the formation. A thick filter cake has a number of disadvantages which include the erosion of the filter cake by circulating drilling fluid, sticking of the drill pipe, reduction of hydrostatic pressure and partial collapsing of the walls of the borehole during tool removal.

Drilling fluids used in oil and gas exploration today are principally water based or oil based (including synthetic oil based). Often, oil based fluids are not desired since there present greater handling concerns and fire hazards. In addition, oil based fluids are environmentally unacceptable compared to water based muds. Further, the cost per barrel of oil based muds is higher versus water based muds since oil is much more expensive than water. The justification for selecting an oil based mud over an aqueous based mud is normally attributable to its superior performance under particular conditions of use. For instance, oil based fluids generally offer superior lubricity properties over water based fluids. Further, with certain hydrophilic formations, such as shale, oil based fluids are normally preferred since penetration of the formation by water is avoided. Shales can be drilled in the presence of hydrous clays and bentonites, with no swelling or sloughing, which might cause pipe sticking difficulties. Furthermore, oil based muds may be formulated to withstand temperatures up to 500° F.

More recently, synthetic oil based muds have become prominent which contain synthetic polymers. While synthetic oil based muds often have enhanced performance capabilities, they are significantly more expensive. In light of increased environmental risks, additional costs relating to wellsite housekeeping, transportation and approved disposal of oil-based fluids, synthetic oil based fluids and drilled cuttings, there has been renewed interests in the development of improved water-based drilling fluids.

Typically, water based drilling fluids consist of a liquid phase and a suspended solid phase. The liquid phase is either fresh or saline water. The solid phase, which is suspended within the liquid phase, can comprise a multitude of materials blended to meet the particular needs at hand. As an example, barite (barium sulfate), with a specific gravity over 4.1, is often used as a weighting constituent to increase the bulk density of the drilling fluid when high pressure formations are being penetrated. Other additives are used to control drilling fluid circulation loss when certain types of high porosity, low pressure formations are penetrated.

Typically, the requisite viscosity of the drilling fluid is provided by one or more viscosifying agents. The viscosifying agent further serves to promote the suspension of the weighting agent in the fluid. A commonly used viscosifying agent is sodium montmorillonite (bentonite), a naturally occurring commercial clay. Bentonite, however, has inherent performance limitations in certain oil well drilling applications—particularly when high geological formation temperature combines with other geological contaminants such as carbon dioxide and hydratable drilled solids cause undesirable elevated viscosity. This condition is often hard to control and expensive to rectify.

Other viscosifying agents have been reported in the literature. For example, xanthan gum is often used, with or without bentonite, to slow or prevent sedimentation of weighting agents.

Further, there is a great need for aqueous based drilling fluids which exhibit the same or nearly the same lubricity as oil based fluids. Lubricity is normally measured by the coefficient of friction of the fluid; fluids exhibiting lower coefficients of friction providing greater lubricity. The coefficient of friction for oil based fluids is normally between from about 0.07 to 0.13; the coefficient of friction for water based fluids being normally between from about 0.17 to about 0.30.

In addition, there is a need for water based drilling fluids which, like oil based drilling fluids, are capable of withstanding high temperatures, i.e., in excess of 500° F.

Further, there is a need for water based drilling fluids which are bentonite free, exhibit negligible viscosity at elevated temperatures and which minimize the effect of carbon dioxide and other contaminants on the fluid system.

SUMMARY OF THE INVENTION

Water-based drilling fluids containing crosslinked polyacrylic acid as the viscosifying agent provide the requisite fluid viscosity for drilling fluids. The weight average molecular weight of the crosslinked polyacrylic acid is typically between from about 100,000 to about 10 million. Typically, the drilling fluid contains a low concentration of the crosslinked polyacrylic acid, typically between from about 0.25 to about 3.0, normally between from about 0.5 to about 2.0, pounds per barrel (ppb) of the drilling fluid.

The crosslinked polyacrylic acid is a reaction product of an olefinically-unsaturated carboxylic acid and a crosslinking agent, such as divinyl glycol or a polyalkenyl polyether of a polyhydric alcohol.

The water-based drilling fluid may further contain a lubricant. While conventional lubricants may be used, the preferred lubricant is a sulfurized vegetable oil, such as sulfonated vegetable oil, or a fatty acid polyglycerine ester. Blends of lubricants may further be used.

In addition to further optionally containing a weighting agent and/or a wetting agent, the drilling fluid may further contain a synthetic silicate or a synthetic smectite clay, most preferably a laponite clay.

The drilling fluid exhibits a lower coefficient of friction than corresponding water based fluids. In fact, the coefficient of friction of the drilling fluid is substantially close to the coefficient of friction of oil based drilling muds. As such, the lubricity of the water based drilling fluid defined herein is substantially similar to the lubricity of oil based drilling muds.

Further, the drilling fluid described herein exhibits stability at temperatures as high as 150° C. and contaminant resistance. Further, the fluid is stable in the presence of high fluid solids content, reactive drilled shale cuttings and carbon dioxide.

BRIEF DESCRIPTION OF THE DRAWINGS

In order to more fully understand the drawings referred to in the detailed description of the present invention, a brief description of each drawing is presented, in which:

FIG. 1 demonstrates the coefficient of friction between the aqueous drilling fluids described herein containing crosslinked polyacrylic acid versus aqueous drilling fluid which does not contain crosslinked polyacrylic acid. In addition, FIG. 1 compares the coefficient of friction between the aqueous drilling fluids described herein and traditional oil based drilling fluids.

DETAILED DESCRIPTION OF THE PREFERRED EMBODIMENTS

The drilling fluid described herein is an environmentally-friendly water-based drilling fluid. It contains a high molecular weight water-insoluble polymer. Typically, the weight average molecular weight of the crosslinked polyacrylic acid is between from about 100,000 to about 10 million, preferably between from about 500,000 to about 5 million.

The high molecular weight polymer typically has the capacity to absorb fluids, such as water. The high molecular polymer may be used in low concentrations to viscosify the water-based drilling fluid. Suitable high molecular polymers include those set forth in U.S. Pat. Nos. 2,798,053 and 5,221,722, herein incorporated by reference.

The high molecular weight polymer is a free acid polymer. The crosslinked polyacrylic acid defined herein is capable of suspending density agents, such as barite and hematite. Further, the crosslinked polyacrylic acid described herein promotes viscosity and the ability to strictly control fluid flow mechanics in the fluid.

In a preferred embodiment, the polymer is a copolymer of two essential monomeric ingredients—one being a monomeric olefinically-unsaturated carboxylic acid and the other being a crosslinking agent.

The olefinically-unsaturated carboxylic acid monomer contains at least one carbon-to-carbon olefinic double bond, and at least one carboxyl group. The acid is preferably of the formula:

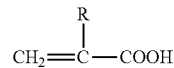

wherein R is a substituent selected from the class consisting of hydrogen, halogen, hydroxyl, lactone, lactam and the cyanogens (—CN≡N) groups, monovalent alkyl radicals, monovalent aryl radicals, monovalent aralkyl radicals, monovalent alkaryl radicals and monovalent cycloaliphatic radicals.

Illustrative acids are acrylic acid, methacrylic acid, ethacrylic acid, chloro-acrylic acid, bromo-acrylic acid, maleic acid or anhydride, beta-methyl acrylic acid (crotonic acid), cyano-acrylic acid, alpha-phenyl acrylic acid, alpha-benzyl acrylic acid as well as alpha-cyclohexyl acrylic acid.

Further, the olefinically-unsaturated carboxylic acid monomer may be beta-acryloxy propionic acid, hydrosorbic acid, sorbic acid, alpha-chloro sorbic acid, cinnamic acid, beta-styryl acrylic acid (1-carboxy-4-phenyl butadiene-1,3), hydromuconic acid, itaconic acid, citraconic acid, mesaconic acid, muconic acid, glutaconic acid, aconitic acid and others.

Suitable crosslinking agents include divinyl glycol and the polyalkenyl polyethers of a polyhydric alcohol, the polyhydric alcohol containing at least 4 carbon atoms to which are attached at least 3 hydroxyl groups and the polyether containing more than one alkenyl ether group per molecule.

The polyalkenyl polyethers alternatively used as crosslinking agents contain more than one alkenyl ether (preferably two or more) grouping per molecule and those most useful possess alkenyl groups in which a olefinic double bond is present attached to a terminal methylene grouping thusly $CH_2=C<$. They are made by the etherification of a polyhydric alcohol containing at least 4 carbon atoms and at least 3 hydroxyl groups. Compounds of this class are readily produced, for example, by a Williamson-type synthesis, in which an alkenyl halide, or a mixture of such halides, such as allyl chloride, allyl bromide, methallyl chloride or methallyl bromide, is reacted with a strongly alkaline aqueous solution of one or more of the polyhydric alcohols. The product of such a synthesis usually is a complex mixture of polyethers containing varying numbers of ether groups on each molecule. Analysis of such materials, therefore, reveals only the average number of ether groupings on each molecule.

Illustrative polyhydric alcohols include the butane triols such as 1,2,3-butane triol, 2,3,4-trihydroxy butyric acid, the aldotetroses such as erythrose and threose, ketotetroses such as erythrulose; the aldopentoses such as arabinose, xylose, lyxose, and ribose; ketopentoses such as araboketose and xyloketose; aldohexoses such as glucose, galactose, mannose, gullose, idose, talose and allose; ketohexoses such as fructose or levulose and sorbose; other sugars including the mono-, di-, tri- and polysaccharides such as sucrose, maltose, lactose and raffinose; the hexosans, pentosans and hexosan-pentosans, the galactomannan and glucomannan gums and starch; reduced forms of the above and other sugars and polysaccharides such as the "sugar alcohols" erythritol, xylitol, mono-di- and tri-pentaerythritol, arabitol, mannitol, iditol, tolitol, sorbitol, inositol and dulcitol; the oxidized derivatives of the sugars in which the oxidation has not been carried to the point where the original monosaccharide carbon chain unit is broken such as the mono- and di-carboxylic "sugar acids" including gloconic acid, glucuronic acid, galactonic acid, galaturonic acids, saccharic acid, mucic and pectic acids.

A preferred class of polyhydric alcohols for use in the production of the polyalkenyl polyether monomer is oligosaccharides, monosaccharides such as glucose, galactose, fructose, sorbose, rhamnose, maltose, and lactose, trisaccharides such as raffinose and disaccharides, such as sucrose.

Where the crosslinking agent is a polyalkyenyl polyether, generally between from 5% to 30% by weight of the crosslinked polyacrylic acid is the polyalkenyl polyether, more preferably 10 to 20% by weight.

Preferably, the water-insoluble crosslinked polyacrylic acid is polycarbophil, defined as polyacrylic acid crosslinked with divinyl glycol or 3,4-dihydroxy-1,5-hexadiene. The amount of crosslinker per 100 weight parts monomer may vary up to about 5% by weight, preferably 0.01 to 3%, especially 0.5 to 2% by weight. Suitable polycarbophils and method of making such polymers include those referenced in U.S. Pat. No. 5,221,722, herein incorporated by reference.

In particulate form, the average particle size of the crosslinked polyacrylic acid is less than about 10 microns. Typically, the amount of crosslinked polyacrylic acid in the drilling fluid defined herein is between from about 0.25 to about 3.0, preferably between from about 0.5 to about 2.0, ppb.

The crosslinked polyacrylic acid exhibits a Brookfield viscosity of greater than about 20,000 cPs, and sometimes in excess of 50,000 cPs, when measured at 1% concentration of polymer in water at a pH of 7.0 to 7.5.

Preferred crosslinked polyacrylic acids include modified anionic, high molecular weight acrylic polymers such as Polygel CA, Polygel CB, Polygel CS and Perforamol 32, products of 3V Sigma S.P.A. as well as Carbopol® 674, 941 and 981, products of The Lubrizol Corporation. Such polymers have been reported as being characterized by a viscosity, at 0.2 wt % mucilage (defined as a polymer dispersion in water neutralized to pH 7.5 with NaOH), Brookfield RVT at 20 rpm at 25° C. between 3,000 and 8,500 mPa·s, more notably between from about 3,000 to about 5,000 mPa·s, and at 0.5 wt. % mucilage between from about 3,500 to about 13,000 mPa·s, more notably between from about 6,000 to about 9,000 mPa·s.

The pH of the drilling fluid described herein is attained typically by the addition of caustic. Preferably, the pH of the drilling fluid is between from about 8.0 to about 12.0, more preferably between from about 9.0 to about 11.0, most preferably between from about 9.0 to about 10.0. Bases used to attain the requisite pH of the drilling fluid include NaOH, KOH or $NH_4OH$.

In a preferred embodiment, the water-based drilling fluid further contains a lubricant. Conventional lubricants known in the art for providing lubricity to the fluid may be used. Such lubricants include, for example, mineral oils, synthetic oils, glycols, asphalts, esters (including phosphate esters), sulfurized component of sulfurized fatty acid, sulfurized esters of fatty acids, sulfurized polymerized fatty acids, sulfurized olefins and blends thereof. In addition, blends of such lubricants may also be used. When used, the amount of lubricant (or lubricant blend) is typically in the range of from about 1 to about 15% by mass of the total fluid.

In a preferred embodiment, the lubricating agent is a fatty acid polyglycerine ester or a sulfurized vegetable oil, such as sulfonated vegetable oil.

The drilling fluid may further contain one or more density, or weighting, agents, for increasing the density of the drilling fluid. Suitable density agents include barite; iron oxide, particulate hematite; calcium carbonate; magnesium carbonate; carbonate salts of sodium, potassium, rubidium or cesium; formate salts of sodium, potassium, rubidium or cesium; and mixtures thereof. Barites and/or hematite are especially preferred. Weighting materials are typically relatively dense solids that are insoluble in the drilling fluid continuous phase and are used to increase the density of a drilling fluid. When used the amount of density agent in the drilling fluid is in the range of about 1 to 75%, more usually 2 to 50%, particularly 5 to 40%, by weight of drilling fluid.

In another preferred embodiment, the drilling fluid may contain a synthetic silicate or a synthetic smectite clay as an effective substitute for bentonite to provide fluid viscosity. Preferred is laponite clay. When present, the amount of laponite in the drilling fluid is between from about 0 to about 4, preferably from about 0 to about 1, more preferably from about 0.01 to about 0.25, ppb of the drilling fluid. Laponite is especially desired when the temperature in the treated well is greater than or equal to 150° C.

To avoid damage from oil wet solids, the drilling fluid may further contain a water wetting agent. The wetting agent serves to ensure settling out of solids from the drilling fluid. The wetting agent can be any liquid which will wet the surface of the solids sufficient to permit them to settle in a fluid of lower specific gravity than the solids and which is inert. The wetting agent further frees the solids of air bubbles which cling to the solids, making them buoyant and preventing them from settling out of the liquid. Typically, the wetting agent is a surface active agent or surfactant capable of wetting the solids. In a preferred embodiment, the HLB of the wetting agent is greater than 8.0, preferably greater than 10.0, most preferably greater than 12.0.

Suitable wetting agents includes mixtures of isobutyl cellosolve, oxyalkylated nonyl phenol and alkanolamide as well as alkaryl sufonates, such as dodecylbenzene sulfonate, crude tall oil, oxidized crude tall oil, surfactants, organic phosphate esters, modified imidazolines and amidoamines, alkyl aromatic sulfates and sulfonates, alkoxylated alcohols and alkoxylated sugar esters and combinations thereof. When used, the typical amount of wetting agent in the drilling fluid is between from about 0.1 to about 2, preferably from about 0.1 to about 1, more preferably from about 0.1 to about 0.5 weight percent of the drilling fluid.

The drilling fluids of the invention exhibit a lower coefficient of friction than corresponding water based fluids which do not contain a crosslinked polyacrylic acid as viscosifying agent. Generally, aqueous based drilling fluids have a higher coefficient of friction against rock and metal than oil based drilling fluids. As shown in FIG. 1 for 13.0 to 18.5 ppg fluids, the coefficient of friction of aqueous based fluids (WBM) containing conventional viscosifying agents is between from about 0.20 to about 0.28 (when no lubricant is used) versus being between from about 0.17 to about 0.27 when a lubricant is used. An advantage of oil based fluids (OBM) and synthetic based fluids (SBM) historically has been their lower coefficients of friction, typically being between from about 0.08 to about 0.14 for medium weight OBM fluids and between from about 0.09 to about 0.13 for synthetic based fluids (SBM). Such lower coefficients of friction generally allow an increase in drilling rates in drilling a deviated or horizontal wellbore. The drilling fluids of the invention, shown in FIG. 1 as NDF, exhibit a coefficient of friction approximating that of OBM and SBM, between from about 0.06 to about 0.13.

It has been found that the crosslinked polyacrylic acid water-based drilling fluids described herein have a coefficient of friction less than or equal to 0.15, more specifically less than or equal to 0.12, typically between from about 0.05 to about 0.10. Thus, the water based drilling fluids described herein exhibit a lubricity which parallels the lubricity of commercially available oil based drilling fluids.

In addition, drilling fluids containing the crosslinked polyacrylic acid exhibit high thermal stability. For instance, it has been determined that the fluid exhibits stability at high temperatures in excess of 150° C.

Further, the drilling fluid described herein (containing the crosslinked polyacrylic acid as an effective substitute for bentonite) may be used in geological conditions containing such contaminants as carbon dioxide and hydratable drilled solids without causing undesirable elevated viscosity. As such, high temperature formations with high levels of geologic contaminants may be treated with the aqueous drilling fluids described since the fluids have been found to be notably less affected by high temperature and contamination. As such, the fluids described herein are an economical alternative to bentonite in specialized, low solids drilling fluids. At the described conditions, the aqueous drilling fluid exhibits performance effectiveness superior to conventional aqueous drilling fluids containing bentonite or polymers previously used.

In addition to not exhibiting adverse effects of temperature, the fluid described herein does not exhibit adverse effects from those contaminants which typically cause undesirably high and difficult-to-control viscosity in bentonite-based fluids. For instance, even at highly elevated temperatures, carbon dioxide intrusion into the formation is minimized by use of the drilling fluid described herein.

A further advantage offered by use of the drilling fluid described herein is that it is environmentally friendly. Once they have been treated, the cuttings from the fluid may be disposed of in an environmentally sound manner. Exemplary methods include land farming, landfill disposal, thermal desorption, enhanced bio-degradation, solidification and cuttings injection and bio-remediation.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

Example 1

EvoVis, a product of Newpark Drilling Fluids LLC, containing a crosslinked polyacrylate, was combined with water and caustic and nonylphenolethoxylate, in the amounts set forth in Table I, and mixed at room temperature for approximately 45 minutes. The pH of the resulting fluid was approximately 9.5. Barite and drilled solids (ground up Haynesville shale capable of passing through a 40 mesh sieve) and a polyglycerine blend lubricant (commercially available as NewEase 203 from Newpark Drilling Fluids LLC) were then added and additional caustic to bring the pH of the fluid to 10.0. The resulting formulation was that set forth in Table I:

TABLE I

| Fluid, per barrel | |
|---|---|
| Water, barrel (bbl) | 0.701 |
| Caustic, pounds per barrel (ppb) | 0.20 |
| EvoVis, ppb | 2.5 |
| EvoCon, ppb | 1.0 |
| Caustic, ppb | 0.50 |
| Barite, ppb | 422.24 |
| Dill Solids, ppb | 9.13 |
| NewEase 203, % by volume | 3.0 |

After blending, the mud properties of the fluid were determined. The physical properties of the fluid were determined and are set forth in Table II below.

Viscosity measurements were conducted on a Fann 35 rheometer (B1 bob) while the fluid was sheared at various speeds at 120° F.;

The plastic viscosity (PV) and yield point (YP) were determined in accordance with testing procedures outlined in API Recommended Practice 13-B1 Third Edition, December 2003.

TABLE II

| Properties | After Initial Blending |
|---|---|
| Density, lb/gal | 16.0 |
| 600 rpm/300 rpm | 85/51 |
| 200 rpm/100 rpm | 39/25 |
| 6 rpm/3 rpm | 4/3 |
| Plastic viscosity @120° F., cP | 34 |
| Yield point, lb/100 ft$^2$ | 17 |
| 10 sec gel, lb/100 ft$^2$ | 4 |
| 10 min gel, lb/100 ft$^2$ | 7 |
| pH (Meter) @ 75° F. | 8.4 |
| Lubricity Coefficient | 0.087 |

From the foregoing, it will be observed that numerous variations and modifications may be effected without departing from the true spirit and scope of the novel concepts of the invention.

What is claimed is:

1. A water-based drilling fluid comprising a a crosslinked polyacrylic acid dispersed in an aqueous phase and a density agent suspended in the aqueous phase, the aqueous phase consisting essentially of fresh water or saline water, the crosslinked polyacrylic acid having a Brookfield viscosity of greater than about 20,000 cPs in a 1% dispersion, the pH of the dispersion being greater than or equal to 7.0, and wherein the weight average molecular weight of the polyacrylic acid is from about 100,000 to 10 million, and the coefficient of friction of the water-based drilling fluid is less than or equal to 0.15.

2. The water-based drilling fluid of claim 1, further comprising laponite.

3. The water-based drilling fluid of claim 1, further comprising a lubricant in addition to the said aqueous phase.

4. The water-based drilling fluid of claim 3, wherein the lubricant comprises a lubricating agent selected from the group consisting of sulfonated vegetable oils and fatty acid polyglycerine esters.

5. The water-based drilling fluid of claim 1, wherein the weight average molecular weight of the crosslinked polyacrylic acid is between from about 500,000 to 5 million.

6. The water-based drilling fluid of claim 1, wherein the crosslinked polyacrylic acid is comprised of a polyacrylic acid or a salt thereof crosslinked with at least one crosslinking agent selected from the group consisting of polyalkenyl ethers and divinyl glycol.

7. The water-based drilling fluid of claim 6, wherein the crosslinking agent is divinyl glycol.

8. The water-based drilling fluid of claim 1, wherein the coefficient of friction of the fluid is less than 0.12.

9. The water-based drilling fluid of claim 1, wherein the density agent is at least one member selected from the group consisting of barite; hematite; iron oxide; calcium carbonate; magnesium carbonate; carbonate salts of sodium, potassium, rubidium or cesium; formate salts of sodium, potassium, rubidium or cesium; and mixtures thereof.

10. The water-based drilling fluid of claim 9, wherein the density agent is barite or hematite.

11. The water-based drilling fluid of claim 1, wherein the crosslinked polyacrylic acid has a Brookfield viscosity greater than about 50,000 cPs in a 1% dispersion at a pH of 7.0 to 7.5.

12. The water-based drilling fluid of claim 6, wherein the crosslinking agent is a polyalkenyl ether.

13. The water-based drilling fluid of claim 12, wherein the crosslinking agent is produced by etherification of a polyhydric alcohol containing at least 4 carbon atoms and at least 3 hydroxyl groups.

14. The water-based drilling fluid of claim 1, wherein the fluid is void of bentonite.

15. The water-based drilling fluid of claim 1, wherein the fluid further comprises a water wetting agent.

16. A water-based drilling fluid comprising a lubricant, a liquid phase, a crosslinked polyacrylic acid dispersed in the liquid phase, wherein the liquid phase consists essentially of fresh water or saline water and wherein the crosslinked polyacrylic acid has Brookfield viscosity at 20 rpm at 25° C. between from about 3,500 and 13,000 at 0.5 wt. % mucilage, the amount of crosslinked polyacrylic acid in the water-based drilling fluid being between from about 0.2 to about 0.5 weight percent and further wherein the weight average molecular weight of the polyacrylic acid is between from about 100,000 to 10 million and the coefficient of friction of the water-based drilling fluid is less than or equal to 0.15.

17. The water-based drilling fluid of claim 16, wherein the lubricant is selected from the group consisting of fatty acid polyglycerine esters and sulfonated vegetable oils.

18. The water-based drilling fluid of claim 16, wherein the weight average molecular weight of the crosslinked polyacrylic acid is between from about 500,000 to 5 million.

19. The water-based drilling fluid of claim 16, wherein the crosslinked polyacrylic acid is comprised of polyacrylic acid or a salt thereof crosslinked with at least one crosslinking agent selected from the group consisting of polyalkenyl ethers and divinyl glycol.

20. The water-based drilling fluid of claim 16, further comprising a density agent suspended in the liquid phase.

21. The water-based drilling fluid of claim 20, wherein the density agent is at least one member selected from the group consisting of barite; hematite; iron oxide; calcium carbonate; magnesium carbonate; carbonate salts of sodium, potassium, rubidium or cesium; formate salts of sodium, potassium, rubidium or cesium; and mixtures thereof.

22. The water-based drilling fluid of claim 16, further comprising a laponite clay.

23. The water-based drilling fluid of claim 16, further comprising a water wetting agent.

24. The water-based drilling fluid of claim 23, wherein the HLB of the water wetting agent is greater than 8.0.

25. The water-based drilling fluid of claim 16, wherein the crosslinked polyacrylic acid is derived from at least one monomer selected from the group consisting of acrylic acid, methacrylic acid, ethacrylic acid, chloro-acrylic acid, bromo-acrylic acid, maleic acid or anhydride, beta-methyl acrylic acid (crotonic acid), cyano-acrylic acid, alpha-phenyl acrylic acid, alpha-benzyl acrylic acid and alpha-cyclohexyl acrylic acid.

26. The water-based drilling fluid of claim 16, wherein the fluid is stable at temperatures in excess of 150° C.

27. The water-based drilling fluid of claim 16, wherein the pH of the of the water-based drilling fluid is between from about 8.0 to about 12.0.

28. A water-based drilling fluid having a liquid phase and a solid phase suspended in the liquid phase, wherein the liquid phase consists essentially of either fresh or saline water and the suspended solid phase comprises a crosslinked polyacrylic acid having a Brookfield viscosity at 20 rpm at 25° C. between from about 3,500 and 13,000 at 0.5 wt. % mucilage, the pH of the water-based drilling fluid being greater than or equal to 7.0 and wherein the weight average molecular weight of the crosslinked polyacrylic acid is between from about 100,000 to 10 million and the coefficient of friction of the water-based drilling fluid is less than or equal to 0.15.

29. The water-based drilling fluid of claim 28, wherein the water-based drilling fluid further comprises a lubricant.

* * * * *